United States Patent
Wei et al.

(10) Patent No.: US 9,899,854 B2
(45) Date of Patent: Feb. 20, 2018

(54) MOBILE TERMINAL, MASTER DATA COMMUNICATION DEVICE AND MOBILE TERMINAL CHARGING SYSTEM AND METHOD

(71) Applicant: ZTE Corporation, Shenzhen, Guangdong (CN)

(72) Inventors: Jianbin Wei, Shenzhen (CN); Kejun Sun, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 57 days.

(21) Appl. No.: 14/428,826

(22) PCT Filed: Aug. 1, 2013

(86) PCT No.: PCT/CN2013/080642
§ 371 (c)(1),
(2) Date: Mar. 17, 2015

(87) PCT Pub. No.: WO2013/178191
PCT Pub. Date: Dec. 5, 2013

(65) Prior Publication Data
US 2015/0256018 A1    Sep. 10, 2015

(30) Foreign Application Priority Data
Sep. 19, 2012  (CN) .......................... 2012 1 0347714

(51) Int. Cl.
*H04M 1/00*   (2006.01)
*H02J 7/00*   (2006.01)
(Continued)

(52) U.S. Cl.
CPC .............. *H02J 7/0055* (2013.01); *H02J 3/14* (2013.01); *H02J 7/007* (2013.01); *H02J 7/0052* (2013.01);
(Continued)

(58) Field of Classification Search
USPC ........................................................ 455/573
See application file for complete search history.

(56) References Cited

U.S. PATENT DOCUMENTS 7,884,571 B2    2/2011 Veselic
2004/0189251 A1*  9/2004 Kutkut .................... H02J 7/022
                                                   320/128
(Continued)

FOREIGN PATENT DOCUMENTS

CN    2569461 Y    8/2003
CN    1617620 A    5/2005
(Continued)

OTHER PUBLICATIONS

International Search Report in international application No. PCT/CN2013/080642, dated Nov. 7, 2013.
(Continued)

*Primary Examiner* — Lana N Le
(74) *Attorney, Agent, or Firm* — Oppedahl Patent Law Firm LLC

(57) ABSTRACT

A mobile terminal, a master data communication device and a mobile terminal charging system and method are provided. The method includes that: a mobile terminal determines whether or not a power supply device is a master data communication device and, if so, determines an appropriate charging mode for charging the mobile terminal. The disclosure not only enables a mobile terminal to select a plurality of adjustable charging modes to charge the mobile terminal but also enables the terminal to select a most appropriate charging mode to charging the mobile terminal, thus improving the charging efficiency.

11 Claims, 2 Drawing Sheets

(51) Int. Cl.
  *H02J 3/14* (2006.01)
  *H02J 13/00* (2006.01)
  *H04M 1/725* (2006.01)
  *H01M 10/44* (2006.01)
  *H01M 10/42* (2006.01)

(52) U.S. Cl.
  CPC ..... *H02J 13/0075* (2013.01); *H04M 1/72527* (2013.01); *H01M 10/44* (2013.01); *H01M 2010/4278* (2013.01); *H01M 2220/30* (2013.01); *H02J 2003/143* (2013.01); *H02J 2007/0062* (2013.01); *Y02B 40/90* (2013.01); *Y02B 90/2653* (2013.01); *Y04S 40/126* (2013.01)

(56) References Cited

U.S. PATENT DOCUMENTS

| | | |
|---|---|---|
| 2007/0024239 A1 | 2/2007 | Park |
| 2008/0084189 A1* | 4/2008 | Kim ............... G06F 1/263 320/160 |
| 2008/0238358 A1 | 10/2008 | Koide |
| 2008/0278119 A1* | 11/2008 | Veselic ............ H02J 7/0022 455/574 |
| 2010/0007310 A1 | 1/2010 | Kawamoto |
| 2010/0026236 A1* | 2/2010 | Kamiyama ......... H02J 7/025 320/108 |
| 2011/0018503 A1* | 1/2011 | Patino ............. H02J 7/045 320/162 |
| 2011/0103004 A1 | 5/2011 | Brock |
| 2011/0144823 A1 | 6/2011 | Muller |
| 2012/0181983 A1* | 7/2012 | Khan ............ B60L 11/1816 455/127.1 |
| 2013/0076299 A1* | 3/2013 | Chao ............... H02J 7/0004 455/574 |
| 2013/0110340 A1 | 5/2013 | Park |
| 2013/0254580 A1 | 9/2013 | Yan |
| 2014/0035530 A1* | 2/2014 | Shao ............ B60L 11/185 320/109 |
| 2014/0139176 A1* | 5/2014 | Ji ................ H02J 7/0081 320/107 |
| 2014/0347003 A1* | 11/2014 | Sporck ........... H02J 7/0052 320/107 |
| 2015/0278038 A1* | 10/2015 | Halker ............ G06F 11/20 714/3 |

FOREIGN PATENT DOCUMENTS

| | | |
|---|---|---|
| CN | 1797894 A | 7/2006 |
| CN | 101162403 A | 4/2008 |
| CN | 101383627 A | 3/2009 |
| CN | 101853966 A | 10/2010 |
| CN | 102301305 A | 12/2011 |
| CN | 102377221 A | 3/2012 |
| CN | 102868820 A | 1/2013 |
| JP | 2011041394 A | 2/2011 |
| WO | 2005013456 A1 | 2/2005 |

OTHER PUBLICATIONS

English Translation of the Written Opinion of the International Search Authority in international application No. PCT/CN2013/080642, dated Nov. 7, 2013.

Supplementary European Search Report in European application No. 13797906.8, dated Sep. 15, 2015.

* cited by examiner

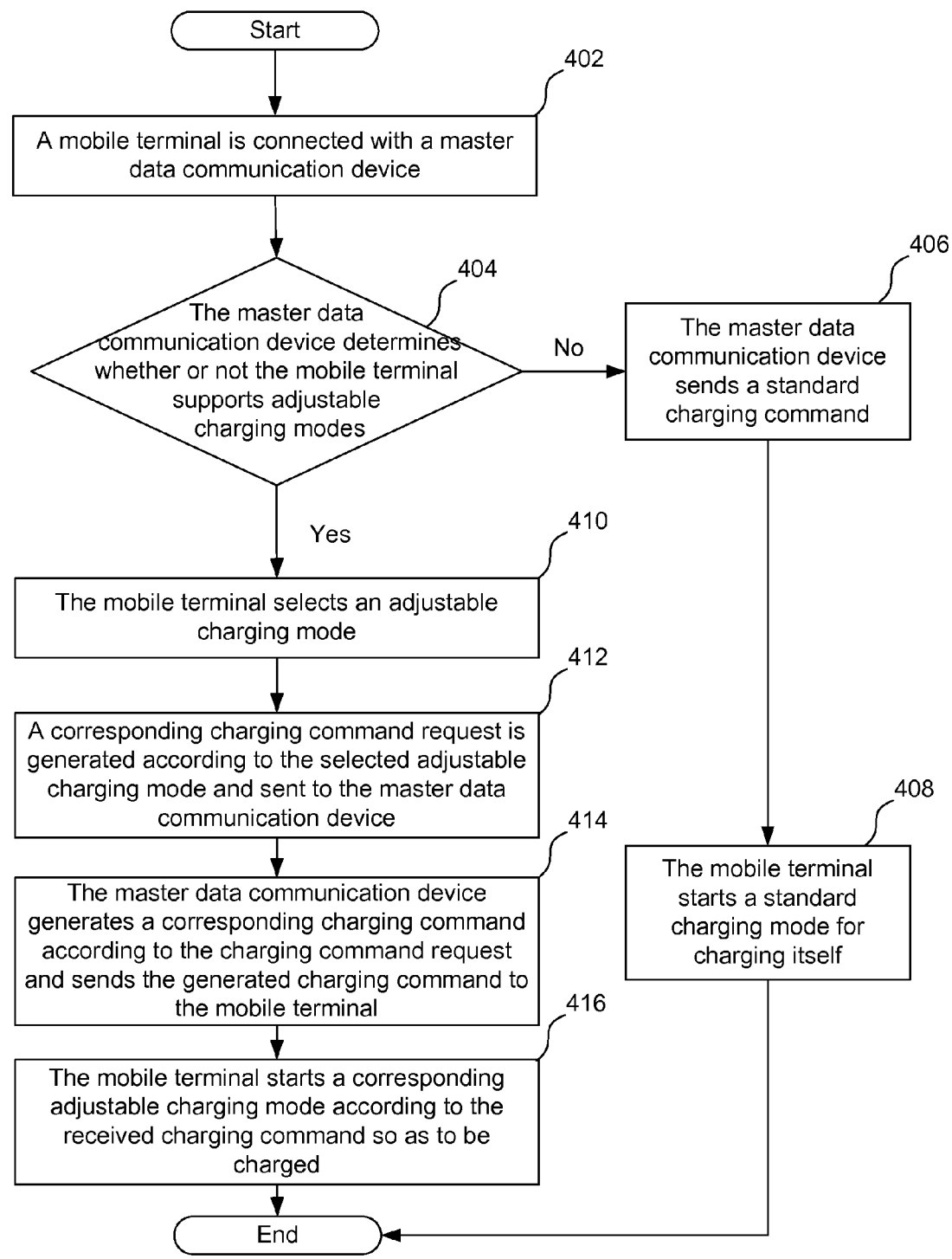

MOBILE TERMINAL, MASTER DATA COMMUNICATION DEVICE AND MOBILE TERMINAL CHARGING SYSTEM AND METHOD

TECHNICAL FIELD

The disclosure relates to the field of electronic communications, and in particular to a mobile terminal, a master data communication device and a mobile terminal charging system and method.

BACKGROUND

At present, it is very convenient to use mobile terminal devices because of the employment of a USB interface as a power interface by chargers for most of mobile terminal devices such as mobile phones, cameras and PAD and due to the easiness of getting a standard USB master device which is capable of charging these mobile terminal devices. However, as the current provided by a standard USB master device is small, for example, the current provided by a standard USB master device with a USB2.0 interface is 500 mA, and that provided by a standard USB master device with a USB1.1 interface is 250 mA, it takes a long time to charge a mobile terminal using a standard USB master device, resulting in poor user experience. Some existing portable power sources with a USB interface are capable of supplying a larger charging current, for example, a current of 800 mA, 1 A or even 1.5 A, than a standard USB master device. For existing USB master devices having a large-current charging capacity, as a USB slave device, that is, a mobile terminal, is incapable of automatically changing the magnitude of a charging current according to the power supply capacity of such a USB master device, the charging efficiency is low. For customers, it is desirable that a mobile terminal is capable of selecting a charging current as needed while providing a data communication service and that a plurality of charging modes are selectable for the convenient and rapid charging of a mobile terminal.

SUMMARY

The main technical problem the disclosure is intended to solve is to provide a mobile terminal, a master data communication device and a mobile terminal charging system and method to avoid a low charging efficiency caused because of the incapability of a mobile terminal to select in real time a charging mode matching with a master device to charge itself.

To address the technical problem above, the technical solution of the disclosure is as follows:

a mobile terminal includes a first interface unit, a first identification unit, a command receiving unit and a charging management unit, wherein the first interface unit is configured to be connected with a power supply device to transfer interaction information between the mobile terminal and the power supply device;

the first identification unit is configured to identify whether or not the power supply device is a master data communication device;

the command receiving unit is configured to receive a charging command sent by the power supply device when an identification result is that the power supply device is a master data communication device; and the charging management unit is configured to select an adjustable charging mode for charging according to the charging command.

In an embodiment, the charging command received by the control unit may be one of a standard charging command, a first charging command and a second charging command; and the adjustable charging mode selected by the charging management unit may be one of: a standard charging mode, a first charging mode and a second charging mode, which are corresponding to the standard charging command, the first charging command and the second charging command, respectively. A working current of the standard charging mode may be 500 mA, a working current in the first charging mode may be 800 mA, and a working current in the second charging mode may be 1000 mA or 1500 mA.

In an embodiment, the mobile terminal further may include a first mode selection unit configured to select a corresponding adjustable charging mode needed by the mobile terminal and send a corresponding charging command request to the power supply device.

In an embodiment, the first interface unit may be a USB interface unit.

A master data communication device is also provided in an embodiment of the disclosure, which includes a second interface unit and a command generation unit, wherein the second interface unit is configured to be connected with a mobile terminal to transfer interaction information between the master data communication device and the mobile terminal; and the command generation unit is configured to generate a charging command and send the generated charging command to the mobile terminal via the second interface unit.

In an embodiment, the master data communication device further may include a second identification unit configured to identify whether or not the mobile terminal supports adjustable charging modes.

In an embodiment, the command generation unit may be configured to automatically generate a charging command corresponding to a maximum working current available in the adjustable charging modes supported by the mobile terminal.

In an embodiment, the master data communication device further may include a second mode selection unit configured to select an adjustable charging mode needed by the mobile terminal, and correspondingly, the command generation unit is configured to generate a corresponding charging command according to the adjustable charging mode selected by the second mode selection unit; or the command generation unit generates a corresponding charging command based on a charging command request received from the mobile terminal.

A mobile terminal charging system is also provided in an embodiment of the disclosure, which includes a master data communication device and a mobile terminal, wherein the master data communication device is connected with the mobile terminal;

the master data communication device is configured to send a charging command to the mobile terminal; and the mobile terminal is configured to receive the charging command sent by the master data communication device and select an adjustable charging mode corresponding to the charging command so as to be charged.

In an embodiment, the master data communication device may be also configured to determine whether or not the mobile terminal supports adjustable charging modes.

In an embodiment, the charging command sent by the master data communication device may be one of a standard charging command, a first charging command and a second charging command; and the adjustable charging mode selected by the mobile terminal may be one of a standard charging mode, a first charging mode and a second charging mode, which are corresponding to the standard charging command, the first charging command and the second charging command, respectively. A working current in the standard charging mode is 500 mA, a working current in the first charging mode is 800 mA, and a working current in the second charging mode is 1000 mA or 1500 mA.

In an embodiment, the master data communication device may send a corresponding charging command according to a charging command request corresponding to the adjustable charging mode selected by the mobile terminal, or may send a corresponding charging command according to an adjustable charging mode selected by the master data communication device for the mobile terminal, or may automatically generate a charging command corresponding to the maximum working current available in the adjustable charging modes supported by the mobile terminal and sends the generated charging command.

A mobile terminal charging method is also provided in an embodiment of the disclosure, which includes that:

a mobile terminal is connected with a master data communication device;

the master data communication device sends a corresponding charging command to the mobile terminal; and the mobile terminal selects a corresponding charging mode according to the charging command so as to be charged.

In an embodiment, before the master data communication device sends a corresponding charging command to the mobile terminal, the method further may include that:

the master data communication device determines whether or not the mobile terminal supports adjustable charging modes and, after determining that the mobile terminal supports adjustable charging modes, sends the corresponding charging command to the mobile terminal.

In an embodiment, the process that the master data communication device sends a corresponding charging command to the mobile terminal may include that:

the mobile terminal selects a needed adjustable charging mode and sends a charging command request corresponding to the selected adjustable charging mode to the master data communication device; and the master data communication device sends a corresponding charging command to the mobile terminal according to the charging command request.

In an embodiment, the process that the master data communication device sends a corresponding charging command to the mobile terminal may include that: the master data communication device selects an adjustable charging mode for the mobile terminal, generates a corresponding charging command according to the adjustable charging mode selected and sends the corresponding charging command generated to the mobile terminal; or the master data communication device automatically generates a charging command corresponding to the maximum working current available in the adjustable charging modes supported by the mobile terminal and sends the generated charging command.

In an embodiment, the charging command sent by the master data communication device may be one of a standard charging command, a first charging command and a second charging command; and the adjustable charging mode selected by the mobile terminal may be one of a standard charging mode, a first charging mode and a second charging mode, which are corresponding to the standard charging command, the first charging command and the second charging command, respectively. A working current in the standard charging mode is 500 mA, a working current in the first charging mode is 800 mA, and a working current in the second charging mode is 1000 mA or 1500 mA.

Embodiments of the disclosure achieve the following beneficial effect: by means of the mobile terminal, the master data communication device and the mobile terminal charging system and method provided herein, a mobile data terminal can determine whether or not a power supply device is a master data communication device and if so, determine an appropriate charging mode for charging itself. In this way, the mobile terminal can not only select a corresponding charging mode for charging itself from a plurality of adjustable charging modes but also select the most appropriate charging mode for charging itself, thus improving the charging efficiency

BRIEF DESCRIPTION OF THE DRAWINGS

FIG. 4 is a flowchart illustrating of a mobile terminal charging method according to an embodiment of the disclosure.

DETAILED DESCRIPTION

In embodiments of the disclosure, a mobile terminal can make a selection from a plurality of charging modes supported by a master device to achieve a user-desired or optimal charging mode, and a user-desired or optimal charging efficiency. Technical solution and the advantages of the disclosure will become clearer from the detailed description of the disclosure when taken in conjunction with accompanying drawings.

Figure 1:
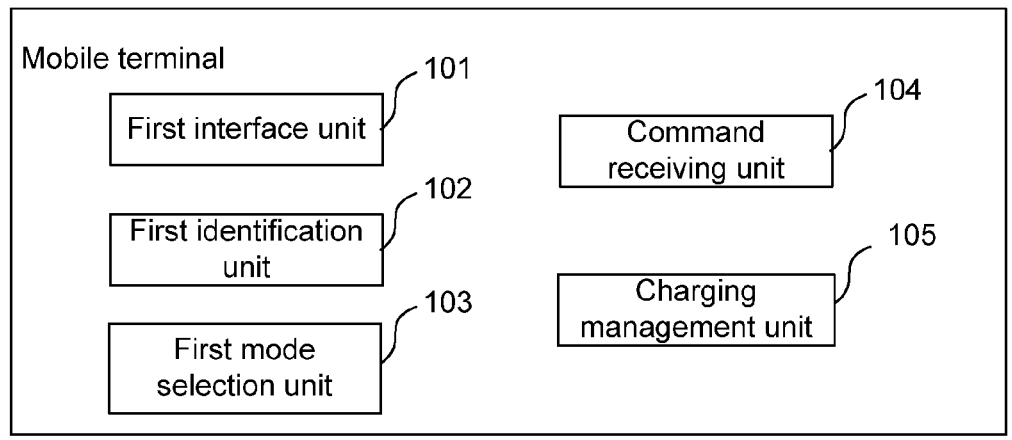
FIG. 1 is a schematic diagram illustrating the structure of a mobile terminal according to an embodiment of the disclosure.

A mobile terminal is provided in an embodiment of the disclosure, which, as shown in FIG. 1, includes: a first interface unit 101, a first identification unit 102, a command receiving unit 104 and a charging management unit 105, wherein the first interface unit 101 is connected with a power supply device to transfer the interaction information between the mobile terminal and the power supply device;

the mobile terminal, which may be connected with the power supply device via a plurality of interfaces, is preferably connected with the power supply device via a USB interface.

The first identification unit 102 is configured to identify whether or not the power supply device is a master data communication device;

Although there are a variety of kinds of power supply devices, such as AC/DC adaptors, standard master devices, portable power sources and master data communication devices, the power supply device here is preferably a master data communication device as the master data communication device is capable of providing a plurality of charging modes for a mobile terminal while performing data communication with the mobile terminal, and also capable of providing both a standard current charging mode and a large current (e.g. 1000 mA) charging mode for the mobile terminal.

The command receiving unit 104 is configured to start a master device charging mode when the identification result is that the power supply device is a master data communication device and to receive a charging command sent by the power supply device;

when the first identification unit 102 identifies that the power supply device is a master data communication device, the command receiving unit 104 controls the mobile terminal to enter a charging mode and receives charging commands sent by a plurality of power supply devices.

The charging management unit 105 is configured to select a corresponding adjustable charging mode for charging according to the charging command received by the command receiving unit 104.

In the embodiment, a variety of kinds of charging commands may be sent by the power supply device, including one of a standard charging command, a first charging command and a second charging command; and there are also a plurality of adjustable charging modes corresponding to the mobile terminal, including a standard charging mode, a first charging mode and a second charging mode, which are corresponding to the foregoing charging commands, respectively. Specifically, the standard charging command is corresponding to the standard charging mode, the first charging command is corresponding to the first charging mode, and the second charging command is corresponding to the second charging mode. In an embodiment, the working current in the standard charging mode, which is the working current commonly used by the power supply device, is preferably 500 mA; the working current in the first charging mode, which is a relatively large working current that the power supply device can supply, is usually 800 mA; the working current in the second charging mode, which is the maximum working current that the power supply device can supply, is preferably 1000 mA or 1500 mA; and the working currents mentioned herein cover any working current that can be provided by the power supply device and supported by the mobile terminal, but not limited to a specific working current limited in the disclosure.

In the embodiment, the mobile terminal further includes a first mode selection unit which is mainly configured to select an adjustable charging mode needed by the mobile terminal and send a corresponding charging command request to the power supply device; after the first identification unit 102 identifies that the power supply device is a master data communication device, the user may select a needed adjustable charging mode through the first mode selection unit, generates a corresponding charging command request and sends the generated charging command to the power supply device, the power supply device generates, according to the charging command request, a charging command corresponding to the charging mode and sends the generated charging command to the command receiving unit 104, and the charging management unit 105 starts a corresponding charging mode.

In the embodiment, as the first interface unit 101 is a USB interface unit, the identification of the power supply device as a master data communication device by the first identification unit 104 mainly includes the following identification steps of:

determining whether or not the power supply device is an AC/DC adaptor with a USB interface or a USB master device by detecting whether or not the D+ signal pin and the D− signal pin of the USB are short-circuited; if the D+ signal pin and the D− signal pin of the USB are short-circuited, determining that the power supply device is an AC/DC adaptor with a USB interface, otherwise, determining that the power supply device is a USB master device; and sequentially determining whether or not the power supply device is a portable power source with a USB interface or a master data communication device by detecting whether or not there are signals at the D+ signal pin and the D− signal pin of the USB, determining that the power supply device is a master data communication device if there are signals at the D+ signal pin and the D− signal pin of the USB, otherwise, determining that the power supply device is a portable power source with a USB interface.

Figure 2:
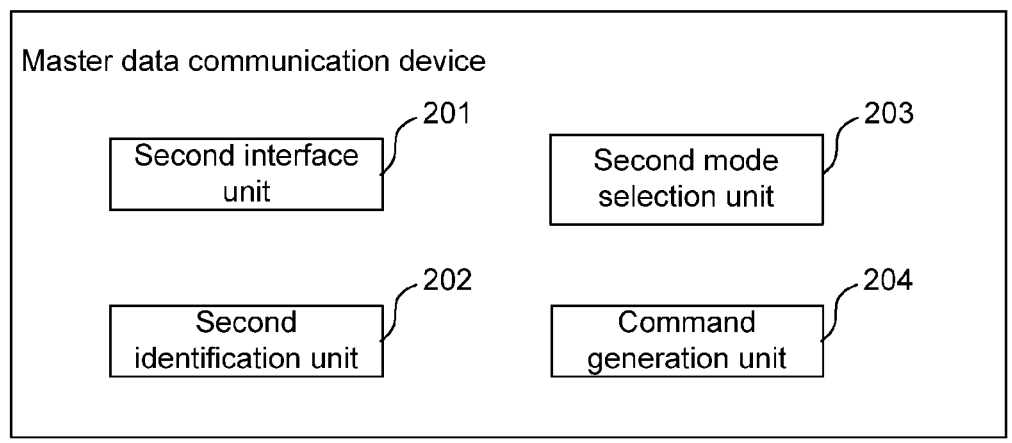
FIG. 2 is a schematic diagram illustrating the structure of a master data communication device according to an embodiment of the disclosure.

A master data communication device is also provided in an embodiment of the disclosure, which, as shown in FIG. 2, includes: a second interface unit 201, a second identification unit 202 and a command generation unit 204, wherein the second interface unit 201 is connected with a mobile terminal to transfer the interaction information between the master data communication device and the mobile terminal;

the second identification unit 202 is configured to identify whether or not the mobile terminal supports adjustable charging modes; after being connected with the mobile terminal, the second identification unit needs to identify the mobile terminal so as to determine whether or not the mobile terminal supports adjustable charging modes;

the specific determination process is as follows: the second identification unit sends a test command and analyzes the result information fed back to determine whether or not the mobile terminal supports adjustable charging modes; or the second identification unit 202 directly sends a charging command generation request to the command generation unit 204, and the command generation unit 204 sends a first or second charging command to the mobile terminal; if the result information fed back is an acknowledgement, which indicates that the mobile terminal supports adjustable charging modes, then the mobile terminal starts a charging mode corresponding to the charging command so as to be charged; and if the result information fed back is a fault, which indicates that the mobile terminal supports no adjustable charging mode, then the command generation unit 204 sends a standard charging command to the mobile terminal; and the command generation unit 204 is configured to generate a charging command and send the generated charging command to the mobile terminal via the second interface unit 201;

the command generation unit 204 is mainly configured to generate a corresponding charging command and send the generated charging command to the mobile terminal to start a corresponding charging mode to charge the mobile terminal.

In the embodiment, the master data communication device further may include a second mode selection unit 203 configured to select an adjustable charging mode needed by the mobile terminal; in consideration of the situation that a mobile terminal is out of power and cannot be launched, which happens sometimes, and the situation that a user is used to performing a charging operation at the side of the master data communication device, the user may select an adjustable charging mode supported by the terminal on the interface of the master data communication device through the second mode selection unit 203, and the command generation unit 204 generates a corresponding charging command according to the adjustable charging mode selected by the second mode selection unit 203. In the embodiment, the command generation unit 204 may further generate a corresponding charging command based on a charging command request sent by the mobile terminal. If no adjustable charging mode is selected by the user from the mobile terminal or from the master data communication device, then the command generation unit 204 may automatically generate a charging command corresponding to the maximum working current available in the adjustable charging modes supported by the mobile terminal and send the generated charging command to the mobile terminal.

Figure 3:
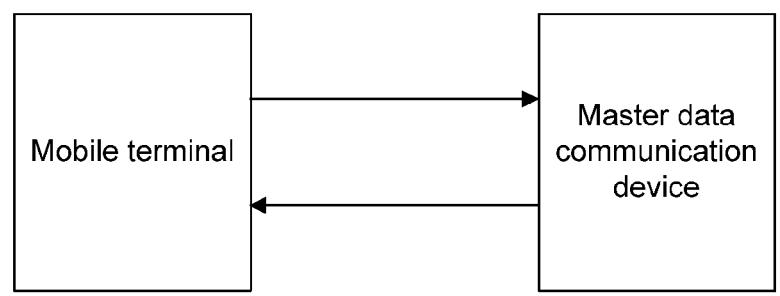
FIG. 3 is a schematic diagram illustrating the structure of a mobile terminal charging system according to an embodiment of the disclosure.

A mobile terminal charging system is also provided in an embodiment of the disclosure, which, as shown in FIG. 3, includes a master data communication device and a mobile terminal, wherein the master data communication device is connected with the mobile terminal and configured to determine whether or not the mobile terminal supports adjustable charging modes and send a charging command to the mobile terminal; and the mobile terminal is configured to receive the charging command sent by the master data communication device and select an adjustable charging mode corresponding to the charging command so as to be charged.

In the embodiment, the charging command sent by the master data communication device is one of a standard charging command, a first charging command and a second charging command; and the adjustable charging mode selected by the mobile terminal includes a standard charging mode, a first charging mode and a second charging mode, which are corresponding to the foregoing charging commands, respectively. Specifically, the standard charging command is corresponding to the standard charging mode, the first charging command is corresponding to the first charging mode, and the second charging command is corresponding to the second charging mode. In an embodiment, the working current in the standard charging mode, which is the working current commonly used by the power supply device, is preferably 500 mA; the working current in the first charging mode, which is a relatively large working current the power supply device can supply, is usually 800 mA; the working current in the second charging mode, which is the maximum working current the power supply device can supply, is preferably 1000 mA or 1500 mA; and the working currents mentioned herein cover any working current that can be provided by the power supply device and supported by the mobile terminal, but not limited to a specific working current limited in the disclosure.

In the embodiment, the master data communication device may send a charging command according to a charging command request corresponding to the adjustable charging mode selected by the mobile terminal, or send a corresponding charging command according to an adjustable charging mode selected by the master data communication device for the mobile terminal, or automatically generate a charging command corresponding to the maximum working current available in the adjustable charging modes supported by the mobile terminal and send the generated charging command.

A mobile terminal charging method is also provided in an embodiment of the disclosure, which specifically includes the following steps that:

a mobile terminal is connected with a master data communication device;

the master data communication device sends a corresponding charging command to the mobile terminal; and the mobile terminal selects a corresponding charging mode according to the charging command so as to be charged.

In the embodiment, the process that the master data communication device sends a corresponding charging command to the mobile terminal specifically includes that:

the mobile terminal selects a needed adjustable charging mode and sends a charging command request corresponding to the selected adjustable charging mode to the master data communication device; and the master data communication device sends a corresponding charging command to the mobile terminal according to the charging command request.

In the embodiment, the charging command sent by the master data communication device is one of a standard charging command, a first charging command and a second charging command; and the adjustable charging mode selected by the mobile terminal includes a standard charging mode, a first charging mode and a second charging mode, which are corresponding to the foregoing charging commands, respectively.

In the embodiment, the master data communication device may directly generate a first or second charging command and send the generated first or second charging command to the mobile terminal; if the result information fed back is acknowledgement, which indicates that the mobile terminal supports adjustable charging modes, then the mobile terminal starts a charging mode corresponding to the charging command so as to be charged; and if the result information fed back is fault, which indicates that the mobile terminal supports no adjustable charging mode, then the master data communication device sends a standard charging command to the mobile terminal.

Alternatively, in the embodiment, before the master data communication device sends a corresponding charging command to the mobile terminal, the method further may include that: the master data communication device determines whether or not the mobile terminal supports adjustable charging modes. As in the embodiment, besides by directly sending a charging command to the mobile terminal, the master data communication device may also determine whether or not the mobile terminal supports adjustable charging modes by sending a test command to the mobile terminal and analyzing the result information fed back.

Alternatively, in the embodiment, the process that the master data communication device sends a charging command to the mobile terminal may be as follows: the master data communication device selects an adjustable charging mode for the mobile terminal, generates a corresponding charging command according to the adjustable charging mode selected and sends the charging command generated to the mobile terminal; or the master data communication device automatically generates a charging command corresponding to the maximum working current available in the adjustable charging modes supported by the mobile terminal and sends the generated charging command.

Refer to FIG. 4, the mobile terminal charging method disclosed herein is described in detail below based on a specific embodiment:

Step 402: a mobile terminal is connected with a master data communication device, and then Step 404 is executed;

Step 404: the master data communication device determines whether or not the mobile terminal supports adjustable charging modes, if so, Step 410 is executed, otherwise, Step 406 is executed;

in this step, the master data communication device sends a test command to determine whether or not the mobile terminal supports adjustable charging modes;

Step 406: the master data communication device sends a standard charging command, and then Step 408 is executed;

Step 408: the mobile terminal starts a standard charging mode for charging itself;

Step 410: the mobile terminal selects an adjustable charging mode and then Step 412 is executed;

in this step, in consideration of the situation that a mobile terminal may go out of power and cannot be launched, which happens sometimes, and the situation that a user is used to performing a charging operation at the side of the master data communication device, the user may select an adjustable charging mode supported by the terminal on the interface of the master data communication device through the second mode selection unit of the master data communication device, and the command generation unit of the master data communication device generates a corresponding charging command according to the adjustable charging mode selected by the second mode selection unit. In the embodiment, the command generation unit may further generate a corresponding charging command based on a charging command request received from the mobile terminal. If no adjustable charging mode is selected by the user from the mobile terminal or from the master data communication device, then the command generation unit may automatically generate a charging command corresponding to the maximum working current available in the adjustable charging modes supported by the mobile terminal and send the generated charging command to the mobile terminal;

Step 412: a corresponding charging command request is generated according to the selected adjustable charging mode and sent to the master data communication device, and then Step 414 is executed;

Step 414: the master data communication device generates a corresponding charging command according to the charging command request and sends the generated charging command to the mobile terminal, and then Step 416 is executed; and Step 416: the mobile terminal selects and starts a corresponding adjustable charging mode according to the received charging command so as to be charged.

In Step 414 and Step 416, the charging command sent by the master data communication device is one of a standard charging command, a first charging command and a second charging command; and the adjustable charging mode selected by the mobile terminal includes a standard charging mode, a first charging mode and a second charging mode, which are corresponding to the foregoing charging commands, respectively. In an embodiment, the working current in the standard charging mode, which is the working current commonly used by the power supply device, is preferably 500 mA; the working current in the first charging mode, which is a relatively large working current the power supply device can supply, is usually 800 mA; the working current in the second charging mode, which is the maximum working current the power supply device can supply, is preferably 1000 mA or 1500 mA; and the working currents mentioned herein cover any working current that can be provided by the power supply device and supported by the mobile terminal, but not limited to a specific working current limited in the disclosure.

The mentioned above is merely detailed description of specific implementation mode of the disclosure but is not to be construed as limiting the specific implementation of the disclosure. It should be appreciated by those ordinary skills in the art that a variety of simple derivations and substitutes can be devised without departing from the spirit and scope of the disclosure, and all the derivations and substitutes should fall within the scope of the disclosure.

The invention claimed is:

1. A master data communication device comprising an interface unit and a command generation unit, wherein the interface unit is configured to be connected with a mobile terminal to transfer interaction information between the master data communication device and the mobile terminal; and the command generation unit is configured to generate a charging command and send the generated charging command to the mobile terminal via the interface unit, wherein the device further comprises a mode selection unit configured to select an adjustable charging mode needed by the mobile terminal, and accordingly, the command generation unit is configured to generate a corresponding charging command according to the adjustable charging mode selected by the mode selection unit; or the command generation unit is configured to generate a corresponding charging command based on a charging command request received from the mobile terminal;

wherein the adjustable charging mode is one of a standard charging mode, a first charging mode and a second charging mode, and a working current in the standard charging mode is a first working current commonly used by the master data communication device, a working current in the first charging mode is a second working current higher than the first working current, a working current in the second charging mode is a third working current higher than the second working current, and the third working current is the maximum working current that the master data communication can supply.

2. The master data communication device according to claim 1, further comprising an identification unit configured to identify whether or not the mobile terminal supports adjustable charging modes.

3. The master data communication device according to claim 1, wherein the command generation unit is configured to automatically generate a charging command corresponding to a maximum working current available in adjustable charging modes supported by the mobile terminal.

4. A mobile terminal charging system comprising a master data communication device and a mobile terminal, wherein the master data communication device is connected with the mobile terminal;

the master data communication device is configured to send a charging command to the mobile terminal; and the mobile terminal is configured to receive the charging command from the master data communication device and select an adjustable charging mode corresponding to the charging command so as to be charged, wherein the master data communication device sends a corresponding charging command according to a charging command request corresponding to the adjustable charging mode selected by the mobile terminal, or sends a corresponding charging command according to the adjustable charging mode selected by the master data communication device for the mobile terminal, or automatically generates a charging command corresponding to a maximum working current available in adjustable charging modes supported by the mobile terminal and sends the generated charging command;

wherein the adjustable charging mode is one of a standard charging mode, a first charging mode and a second charging mode, and a working current in the standard charging mode is a first working current commonly used by the master data communication device, a working current in the first charging mode is a second working current higher than the first working current, a working current in the second charging mode is a third working current higher than the second working current, and the third working current is the maximum working current that the master data communication can supply.

5. The mobile terminal charging system according to claim 4, wherein the master data communication device is further configured to determine whether or not the mobile terminal supports adjustable charging modes.

6. The mobile terminal charging system according to claim 4, wherein the charging command sent by the master data communication device is one of a standard charging command, a first charging command and a second charging command wherein the standard charging mode, the first charging mode and the second charging mode are corresponding to the standard charging command, the first charging command and the second charging command, respectively.

7. The mobile terminal charging system according to claim 6, wherein a working current in the standard charging mode is 500 mA, a working current in the first charging mode is 800 mA, and a working current in the second charging mode is 1000 mA or 1500 mA.

8. A mobile terminal charging method, comprising:
connecting a mobile terminal with a master data communication device;
sending, by the master data communication device, a corresponding charging command to the mobile terminal; and
selecting, by the mobile terminal, a corresponding charging mode according to the corresponding charging command to charge the mobile terminal,
wherein before the master data communication device sends the corresponding charging command to the mobile terminal, the method further comprising: determining, by the master data communication device, whether or not the mobile terminal supports adjustable charging modes; and sending, by the master data communication device, the corresponding charging command to the mobile terminal after the master data communication device determines that the mobile terminal supports adjustable charging modes,
wherein the sending, by the master data communication device, a corresponding charging command to the mobile terminal comprises:
selecting, by the mobile terminal, an adjustable charging mode needed and sending, by the mobile terminal, a charging command request corresponding to the selected adjustable charging mode to the master data communication device; and sending, by the master data communication device, the corresponding charging command to the mobile terminal according to the charging command request; or
selecting, by the master data communication device, an adjustable charging mode for the mobile terminal, generating, by the master data communication device, the corresponding charging command according to the selected adjustable charging mode, and sending, by the master data communication device, the generated charging command to the mobile terminal; or
automatically generating, by the master data communication device, a charging command corresponding to a maximum working current available in adjustable charging modes supported by the mobile terminal and sending, by the master data communication device, the generated charging command to the mobile terminal;
wherein the adjustable charging mode is one of a standard charging mode, a first charging mode and a second charging mode, and a working current in the standard charging mode is a first working current commonly used by the master data communication device, a working current in the first charging mode is a second working current higher than the first working current, a working current in the second charging mode is a third working current higher than the second working current, and the third working current is the maximum working current that the master data communication can supply.

9. The mobile terminal charging method according to claim 8, wherein the charging command sent by the master data communication device is one of a standard charging command, a first charging command and a second charging command, wherein the standard charging mode, the first charging mode and the second charging mode are corresponding to the standard charging command, the first charging command and the second charging command, respectively.

10. The mobile terminal charging method according to claim 9, wherein a working current in the standard charging mode is 500 mA, a working current in the first charging mode is 800 mA, and a working current in the second charging mode is 1000 mA or 1500 mA.

11. The master data communication device according to claim 1, wherein the charging command generated by the command generation unit is one of a standard charging command, a first charging command and a second charging command, wherein the standard charging mode, the first charging mode and the second charging mode are corresponding to the standard charging command, the first charging command and the second charging command, respectively.

* * * * *